United States Patent [19]

Large

[11] Patent Number: 4,887,779
[45] Date of Patent: Dec. 19, 1989

[54] ROLL DRUM SENSOR HOUSING HAVING SLIDING WINDOW

[75] Inventor: David T. Large, Everett, Wash.

[73] Assignee: The Boeing Company, Seattle, Wash.

[21] Appl. No.: 127,491

[22] Filed: Dec. 1, 1987

[51] Int. Cl.⁴ .............................................. B64D 47/00
[52] U.S. Cl. ..................... 244/1 R; 244/129.3; 244/207; 350/584
[58] Field of Search ............... 244/1 R, 129.3, 129.4, 244/137.1, 207; 89/1.815; 354/65, 70, 74; 343/705; 350/319, 584

[56] References Cited

U.S. PATENT DOCUMENTS

| | | | |
|---|---|---|---|
| H,324 | 9/1987 | Rubin | 244/117 |
| 2,469,902 | 5/1949 | Stalker | 244/42 |
| 2,630,983 | 3/1953 | Horne et al. | 354/74 X |
| 2,674,420 | 4/1954 | Johnson | 244/1 |
| 2,749,064 | 6/1957 | Kuhlman, Jr. | 244/137.1 |
| 2,856,542 | 10/1958 | McPheeters | 250/239 |
| 2,919,350 | 12/1959 | Taylor et al. | 250/83.3 |
| 2,954,949 | 10/1960 | Smith et al. | 244/137.1 |
| 3,118,063 | 1/1964 | Kaufman | 250/83.3 |
| 3,156,823 | 11/1964 | Astheimer et al. | 250/83.3 |
| 3,193,682 | 7/1965 | Weiss | 250/83.3 |
| 3,201,591 | 8/1965 | Froelich | 250/83.3 |
| 3,237,010 | 2/1966 | Elliott et al. | 250/83.3 |
| 3,253,808 | 5/1966 | La Fave | 244/75 |
| 3,348,048 | 10/1967 | McLauchlan et al. | 250/83.3 |
| 3,351,756 | 11/1967 | Kallet et al. | 250/83.3 |
| 3,418,478 | 12/1968 | Falbel | 250/202 |
| 3,510,193 | 5/1970 | La Roche | 350/63 |
| 3,656,164 | 4/1972 | Rempt | 343/705 |
| 3,793,518 | 2/1974 | Harper | 250/83.3 |
| 3,794,274 | 2/1974 | Eknes | 244/130 |
| 3,907,409 | 9/1975 | Hausmann | 350/319 |
| 3,918,800 | 11/1975 | Griffin | 350/319 |
| 3,924,826 | 12/1975 | Reinert | 244/129 |
| 3,952,823 | 4/1976 | Hinderks | 180/64 A |
| 3,973,218 | 8/1976 | Kepler et al. | 331/94.5 |
| 4,152,049 | 5/1979 | Hausmann | 350/162 |
| 4,188,631 | 2/1980 | Dougherty et al. | 343/705 |
| 4,703,904 | 11/1987 | Haslund | 244/1 R |

FOREIGN PATENT DOCUMENTS

654189  12/1962  Canada .

Primary Examiner—Sherman D. Basinger
Attorney, Agent, or Firm—Bruce A. Kaser

[57] ABSTRACT

A cylindrical roll drum housing (12) is mounted to the roof (18) of an aircraft fuselage. Enclosed in the housing (12) is a sensor (22) that pivots about an azimuthal axis (82). The sensor (22) normally looks outwardly through sliding window (20) that moves back and forth in correspondence with sensor pivoting. Pressurized air is blown directly across the window's opening (40), and is also blown directly into the housing (12). The window (20) has an inwardly directed airflow-deflecting edge which, in combination with the air blowing, is used to control boundary layer vortices across the window's opening so that they do not interfere with sensor properties.

14 Claims, 5 Drawing Sheets

Fig.7

ROLL DRUM SENSOR HOUSING HAVING SLIDING WINDOW

DESCRIPTION

1. Technical Field

The invention disclosed herein generally relates to auxiliary housings mounted to aerodynamic bodies which have the purpose of enclosing electronic sensing devices and the like. More particularly, the invention relates to housings of this type which are mounted to an aircraft fuselage.

2. Background Information

In the past, cylindrical roll drums or "drum capsules" that are gimbaled so that they pivot or roll about an axis have been used as electronic sensor housings on aircraft. Generally, such housings are mounted sequentially in pods along the roof of the aircraft's fuselage. Each pod contains or encloses a sensor apparatus that is designed to ascertain certain phenomena.

As a skilled person familiar with this technology would know, it is preferable that the housing be designed so that the enclosed sensor is provided with a maximum view of certain selected portions of the sky. In actuality, the sensor's view is typically provided by an open, unglazed window in the housing. Because of certain airflow phenomena, which occur across the window, this arrangement has been known to have a detrimental effect on sensor optics.

Outside boundary layer airflow which normally develops on the housing and other exterior surfaces of the aircraft will have vortices created in the boundary layer as it crosses the window. Since these vortices are positioned directly in the sensor's view, they also act to degrade sensor optics. What is more, the problem becomes enhanced for larger as opposed to smaller windows. For example, in older for the sensor to operate effectively, the sensor housing must not only roll to provide the sensor with a view from one horizon to another on each side of the aircraft, but the sensor must also pivot azimuthally inside the housing for side-to-side views from the aircraft's forward to rearward end. This azimuthal pivoting requires either a very large window, or a somewhat larger window in combination with a relatively complex sensor-mounting gimbal mechanism that enables a certain amount of sensor translational movement during pivoting. Either situation requires larger window openings than what normally would be required if the sensor did not pivot, and therefore enhances the above-described boundary layer problem.

The present invention represents an improvement over past roll drum housings in that the present invention both minimizes the size of the window opening and utilizes pressurized air blowing techniques to control boundary layer effects across the window. The manner by which the invention accomplishes this will become apparent below.

DISCLOSURE OF THE INVENTION

The present invention is an improved roll drum housing designed for use on an aircraft. The housing is generally cylindrical in shape, and is hollow. Positioned inside the housing is a sensor apparatus (hereafter "sensor"). The housing is rotatable about a roll axis that is generally parallel to the aircraft's flight path, and the sensor rolls correspondingly with housing rotation. A window aperture or opening in the side of the housing permits the sensor to view outwardly from horizon to horizon as it rolls. Also, the sensor is independently pivotable inside the housing, but about a separate azimuthal axis which permits side-to-side viewing. The window aperture has a fixed size and slides back and forth as the sensor pivots azimuthally.

Window sliding is accomplished by a window frame member that is slidably positioned across a frame opening in the housing. The window aperture is located in the window frame member and therefore moves as the frame member slides. This aperture has both upstream and downstream edges that are interconnected by a pair of parallel transverse edges. The downstream edge is angled and extends inwardly a sufficient distance with respect to the upstream edge so that the downstream edge deflects the airflow across the opening outwardly, thus acting to prevent boundary layer intrusion through the opening and into the housing. Further, pressurized air is blown from the upstream edge across the opening. This air is blown directly into the boundary layer so that it has a regenerative effect that tends to straighten the boundary layer's path across the window. Further, pressurized air is separately blown inside the housing and exits outwardly through the opening. This also acts to straighten the boundary layer.

Having the window slide as the sensor pivots minimizes the window aperture area required for sensor viewing. This, in turn, alleviates the above-described boundary layer problem to a certain degree. Further, the smaller size enhances both the effectiveness of the window's downstream deflecting edge and the effectiveness of blowing pressurized air adjacent the upstream edge and into the housing's cavity. These features, in combination, cooperate with each other to create uniformity in the boundary layer airflow across the opening, and therefore significantly reduce boundary layer vortices.

BRIEF DESCRIPTION OF THE DRAWINGS

In the drawings, like reference numerals and letters refer to like parts throughout the various views, and wherein.

BEST MODE FOR CARRYING OUT THE INVENTION

Figure 1:
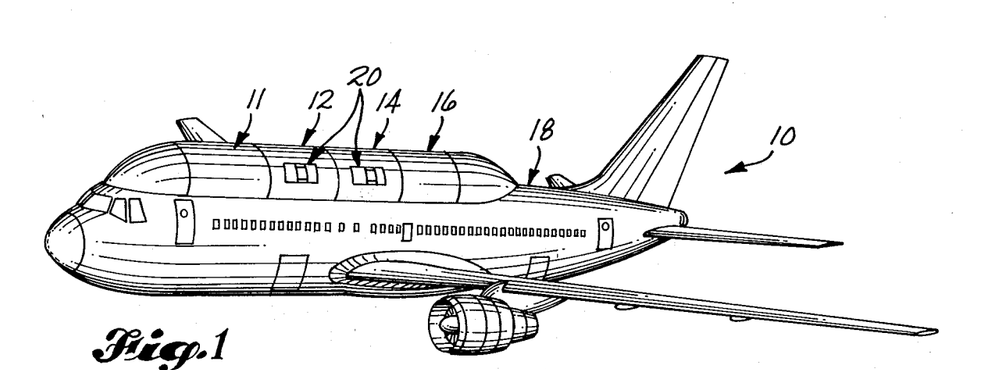
FIG. 1 is a pictorial view of a conventional air transport having mounted to the top of its fuselage a series of roll drums constructed in accordance with the invention.
Figure 2:
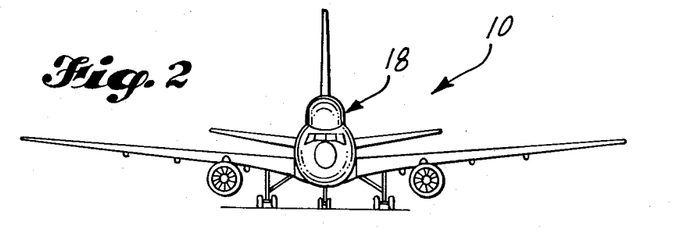
in FIG. 2 is a front-end view of the transport shown in FIG. 1.
Figure 3:
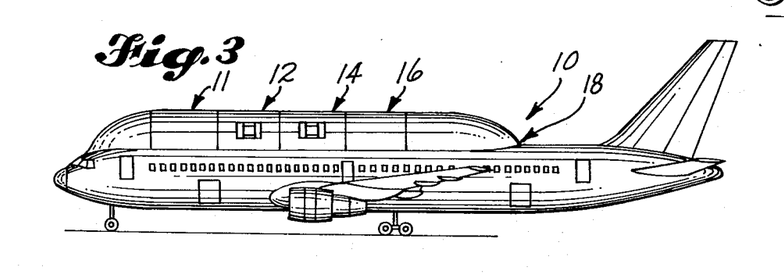
FIG. 3 is a view of the left side of the transport shown in FIGS. 1 and 2.

Referring now to the drawings, and first to FIGS. 1–3, wherein is shown at 10 an aircraft having a plurality of pods or roll drums 11, 12, 14, 16 mounted to the roof portion 18 of its fuselage. Each roll drum 11, 12, 14, 16 is generally cylindrical in form, and, as stated above, may rotate about an axis that is generally parallel to the normal flight path of the aircraft 10.

Each housing encloses a suitable sensor, the purpose and operation of which need not be disclosed herein. A window in the side of each housing, indicated generally at 20, permits the enclosed sensor to have a line-of-sight view from inside to outside the housing.

Housings 10 and 16 in FIGS. 1 and 3 are rotated to a position where their respective windows are not shown; that is, they are either positioned on the other side of the aircraft 10 or are rotated downwardly so that their windows are not exposed to outside airflow. The latter situation reduces aircraft drag and is preferable when the aircraft is in transit to a certain desired geographic location where the sensors are to be used.

The preferred construction of each housing 11, 12, 14, 16, and each window 20 therein, will now be described in greater detail by referring to FIGS. 4–12. In these FIGS., an exemplary embodiment of one of the housings 11, 12, 14, 16 is shown. For the purpose of simplification, this housing is designated in general by reference numeral 12, which corresponds to the like reference numeral in FIGS. 1 and 3.

Figure 4:
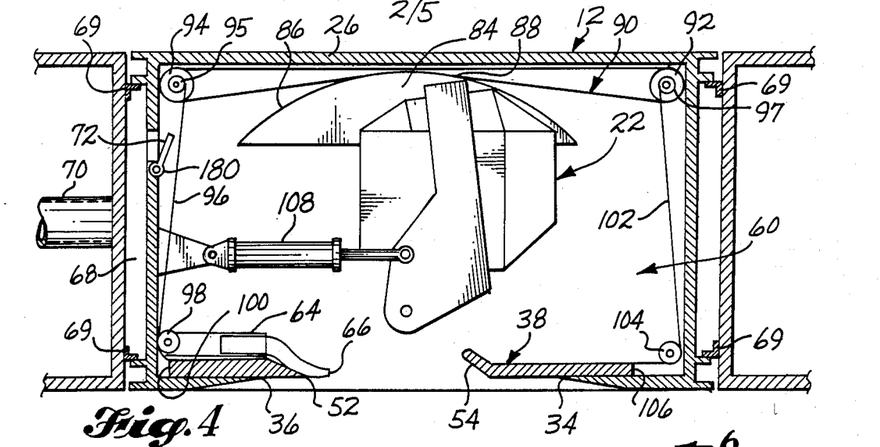
FIG. 4 is a top cross-sectional view of a roll drum housing constructed in accordance with the invention, but shows a non-sectional top view of the housing's contents.
Figure 5:
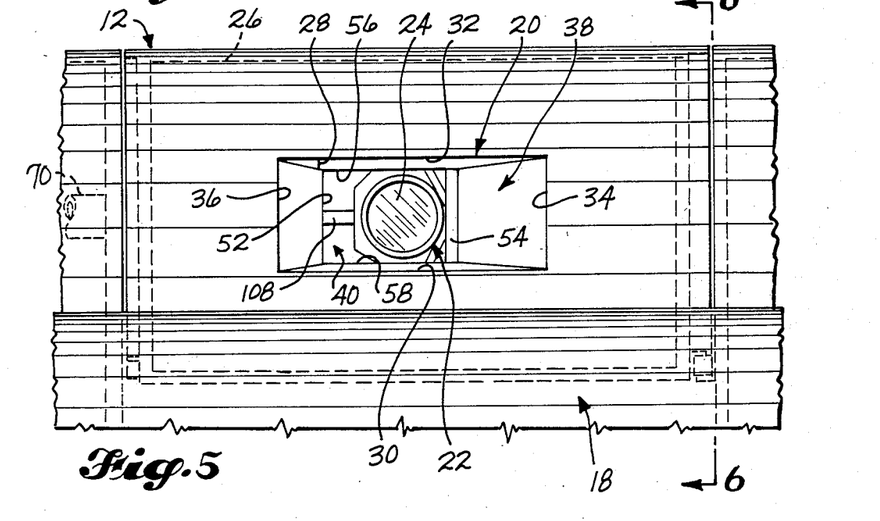
FIG. 5 is a side elevational view of the drum housing shown in FIG. 4.

Referring first to FIG. 4, enclosed in the housing 12 is a sensor 22. This apparatus 22 has, by way of nonlimiting example, an optical lens 24 which is best seen in FIG. 5. The lens 24 "looks" or has a view outwardly through the window 20.

The window 20 includes a fixed frame opening 28 in the housing's sidewall 26. If one viewed this opening 28 straight on from outside the housing 12, as is the view shown in FIG. 5, the opening would appear to have a rectangular perimeter. In actuality, the opening's upper and lower horizontal border edges 30, 32 are straight while its vertical edges 34, 36 are curved, in correspondence with the curvature of the cylindrically shaped housing 12.

Positioned across the fixed opening 28 is a translating window frame member, indicated generally at 38. This frame member has located therein an opening or aperture 40. The frame member 38 slides back and forth across the fixed frame opening 28 correspondingly with pivoting movement of the sensor 22. This will be further described below.

Figure 6:
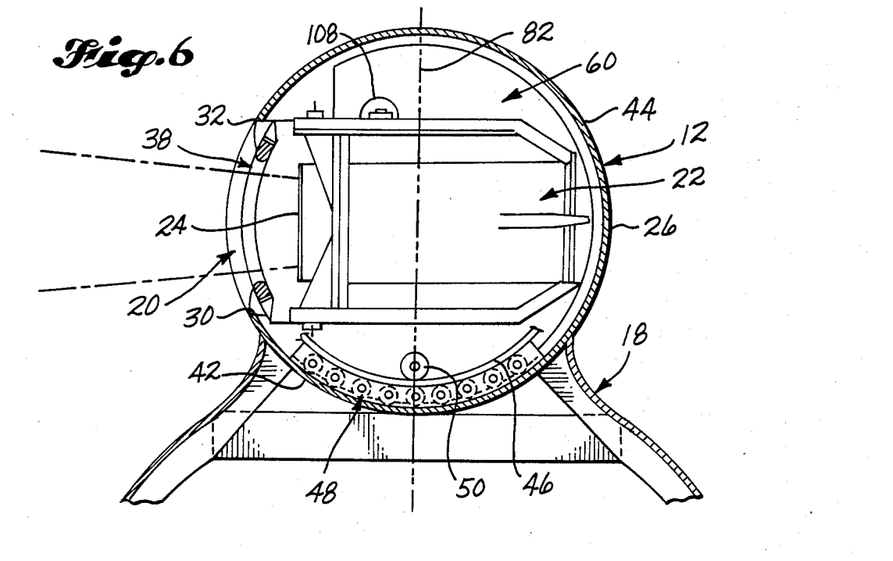
FIG. 6 is a transverse cross-sectional view of the drum housing shown in FIGS. 4 and 5, and is taken along line 6—6 in FIG. 5.
Figure 8:
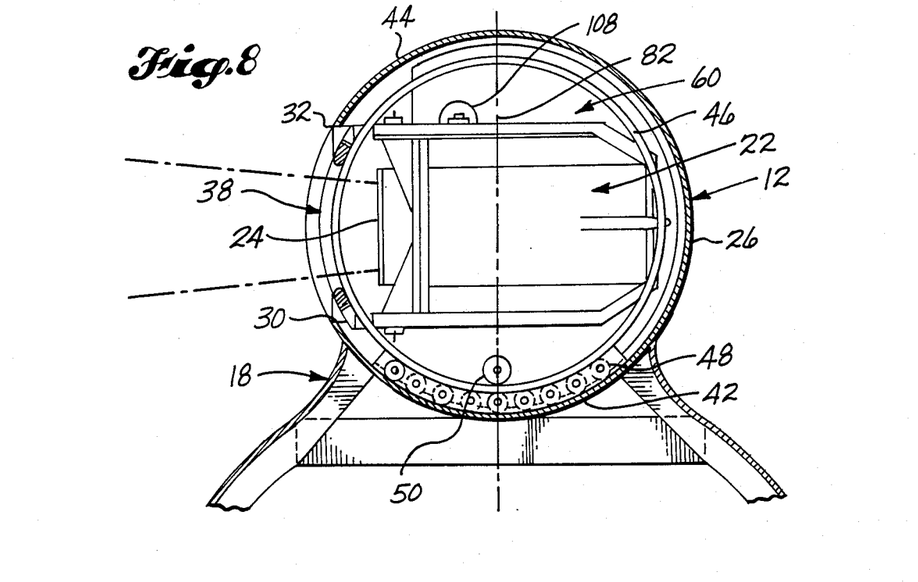
FIG. 8 is a view like FIG. 6, but further illustrates how the housing rolls on top of the fuselage, to permit horizon-to-horizon scanning by the sensor enclosed in the housing.

Referring now to FIGS. 6 and 8, housing "roll" or rotation permits the sensor 22 to view from horizon to horizon on each side of the aircraft. To accomplish this movement, the housing 12 is cradled in the aircraft's roof portion 18. This portion 18 has an upwardly directed circular section shaped to receive the housing's lower circumferential portion 42. The remaining or upper circumferential portion 44 is exposed to the atmosphere.

The housing 12 includes a mounting rail or ring at each end, like the ring 46 shown in FIG. 8. This ring rides on a plurality of rollers 48 which are suitably supported in the fuselage roof portion 18. A wheel or gear 50 is in driving engagement with the ring 46, and is driven in rotation by a suitable electric motor that is not shown in the drawings. Depending on the direction of rotation, it causes the housing 12 to rotate or roll in one direction or another. If desired, the housing can be rotated one complete cycle of 360°.

Figure 9:
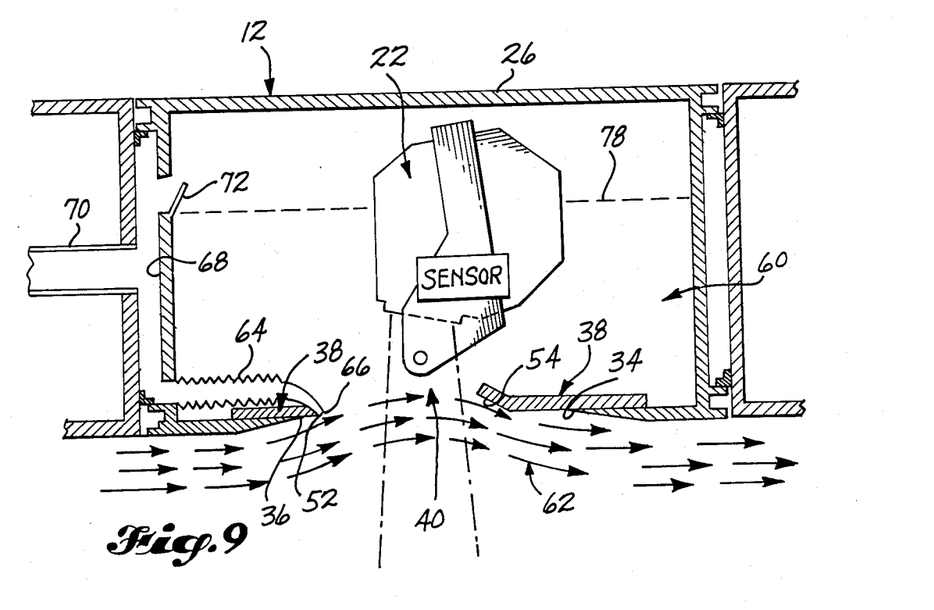
FIG. 9 is a view like FIG. 7, but shows how the inwardly extending downstream edge of the housing's window opening acts to deflect the boundary layer outwardly and thus impede boundary layer intrusion into the housing.

Directing attention once again to FIGS. 4 and 5, the window frame member 38 has an upstream edge 52 and a downstream edge 54. These two edges 52, 54 are interconnected by a pair of spaced, transverse edges 56, 58. All of these edges 52, 54, 56, 58 define the perimeter of the window aperture 40. As can be seen in FIG. 4, the downstream edge 54 extends inwardly into the housing cavity (this cavity is indicated generally by reference numeral 60). In FIG. 9, this edge 54 can be seen to have the function of deflecting boundary layer airflow, indicated at 62, which impedes intrusion of the boundary layer 62 into the cavity 60.

Similar to downstream edge 54, the window frame member's transverse edges 56, 58 may also extend inwardly relative to upstream edge 52. It should be appreciated that at certain times air currents created by aircraft wings and control surfaces will move diagonally across the housing 12. Inward extension of transverse edges 56, 58 will help alleviate vortices created by such currents.

Positioned adjacent the aperture's upstream edge 52, and against the inside surface of the housing's sidewall 26, is a telescopic conduit 64. This conduit 64 extends and retracts as the window frame member 38 slides back and forth across the frame opening 28. The conduit 64 has an outlet port 66 positioned immediately adjacent or next to the upstream edge 52. A source of pressurized air is delivered to the conduit 64 by means of air communication channels 68, 70. Also, provided in the housing sidewall 26 is a port 72 that provides airflow communication between channel 68 and the housing cavity 60. Conventionally known cylindrical seals 69 prevent air leakage from channel 68.

High pressure air is output through conduit outlet port 66 and into the boundary layer 62. This tends to re-energize and straighten the boundary layer. Furthermore, high pressure air is blown into the cavity 60 as shown by arrows 74, which causes further air outflow through the window aperture 40. This is indicated by arrow 76. Blower port 72 is suitably hinge mounted at 180 so that the amount of air communicated into the cavity 60 can be adjusted. In preferred form, an air-permeable pressure barrier, indicated schematically at 78, may be erected across cavity 60. This barrier would provide uniformity of airflow, as indicated by arrows 80, moving across the cavity 60 and toward the window aperture 40.

Figure 7:
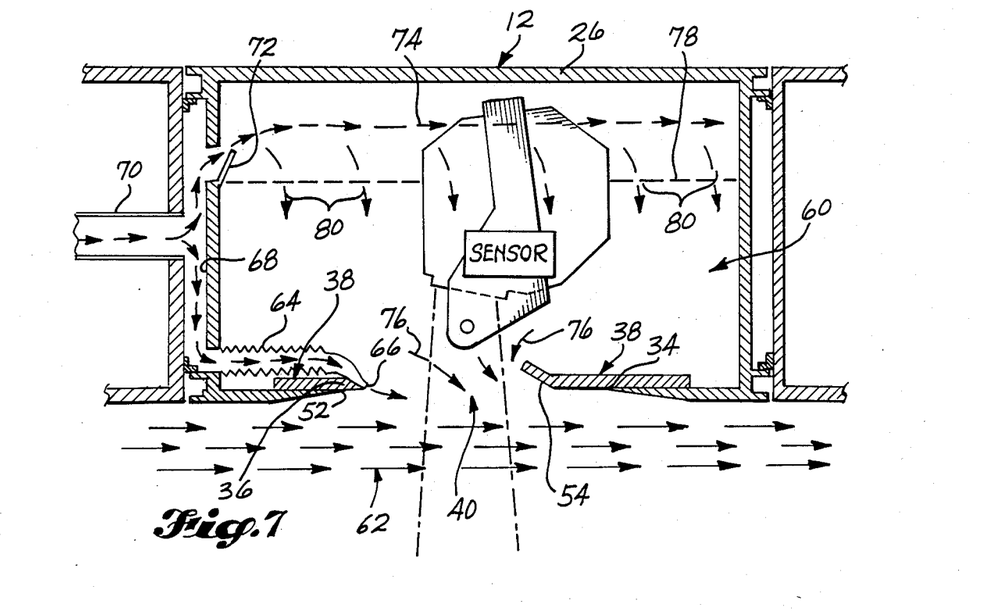
FIG. 7 is a view similar to FIG. 4, but schematically illustrates how high pressure air is blown into the housing and also across the housing's window opening or aperture, to control boundary layer airflow across the aperture.

Air blown into the boundary layer 62 from outlet port 66 and high pressure air blown into the cavity 60 cooperate with the window frame member's downstream edge 54 to create uniformity in the boundary layer 62. This is schematically indicated in FIG. 7. The net effect is that boundary layer vortices across the window aperture 40 are significantly reduced, which further means the boundary layer 62 will not interfere with the optical properties of the lens 24. The sensor 22 is suitably mounted in the housing 12 for pivoting about an azimuthal axis, which is indicated at 82 in FIGS. 6 and 8, and which permits sensor side-to-side viewing. As the sensor 22 pivots back and forth, the window frame member 38 slides. This is accomplished by a cable network that interconnects the sensor 22 and the window frame member 38.

Referring once again to FIG. 4, fixedly attached to the sensor 22 is a cradle portion 84. This portion has a curved or arced surface 86. Fixedly connected to this surface, at or about the position indicated by arrow 88, is a cable loop 90 which is suspended in the housing by pulleys 92, 94. These pulleys 92, 94 are rotated by the loop 90 as the sensor pivots.

Connected to a smaller concentric wheel 95 on one of the pulleys 94 is one end of a first cable or line 96. This line 96 extends around an idler wheel 98 and its other end is connected to an upstream end 100 of the window frame member 38. A second line or cable 102 is connected to a similar wheel 97 on the other loop pulley 92. This latter line 102 similarly extends around another idler wheel 104, at the other end of the housing 12, and is connected to a downstream end 106 of the window frame member 38.

Azimuthal pivoting of the sensor 22 is operated by a suitable actuator 108, which may be in the form of a hydraulic ram or an electro-mechanical equivalent thereof. Extending the actuator 108 causes the sensor 22 to pivot counterclockwise relative to azimuthal axis 82. This in turn causes cable loop 90 to travel in a clockwise direction which rotates and winds the second cable 102 about wheel 97. As it is wound, it pulls the window frame member's downstream edge 106, thus sliding the window correspondingly with sensor pivoting. Retraction of the actuator 108 causes the reverse to occur, meaning the first cable line 96 is then wound about wheel 95 causing it to pull the window frame member 38 in the other direction.

Figures 10, 11, 12:
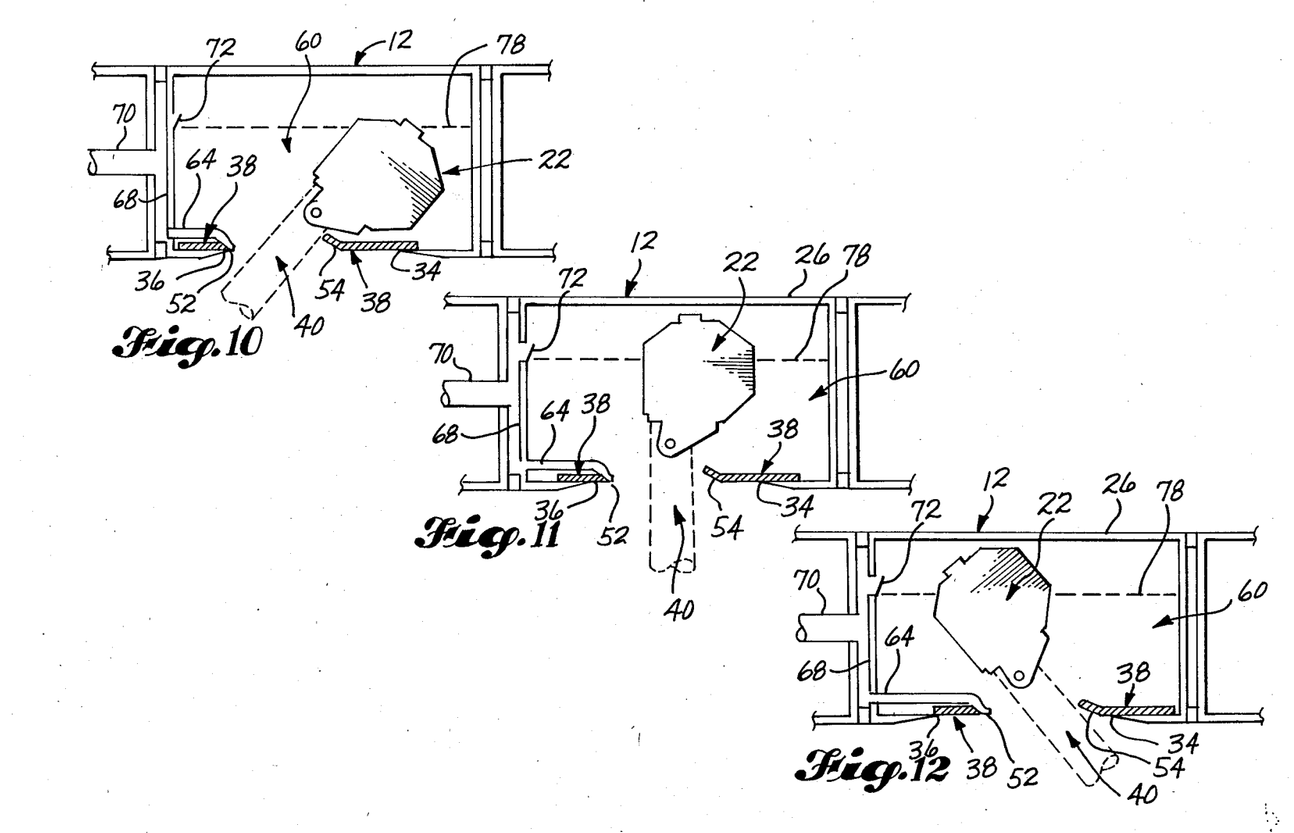
FIG. 10 is a schematic view similar to FIGS. 7 and 9, and illustrates sliding movement of the housing's window opening in correspondence to azimuthal pivoting of the sensor in the housing, and shows the sensor positioned for viewing toward the upstream side of the housing.
FIG. 11 is a view like FIG. 10, but shows the sensor positioned for viewing straight ahead.
FIG. 12 is a view like FIGS. 10 and 11, but shows the sensor positioned for viewing toward the downstream side of the housing.

In general, sliding movement of the window frame member 38 as the sensor 22 pivots is schematically illustrated in FIGS. 10-12. It can be seen that since the window aperture 40 in the window frame member 38 moves along with the sensor 22, the perimeter and area of the opening 40 as defined by window frame member edges 52, 54, 56, 58, can be minimized. This enhances the effectiveness of the pressurized air blowing that is provided at the window's upstream edge and in the housing's cavity.

Having thus described the best mode for carrying out the invention, it should be appreciated that many modifications could be made to both the housing and the above-identified structure for controlling boundary layer airflow without departing from the spirit and scope of the invention. Any patent protection due to the patent applicant is, therefore, not to be limited by the above description. Rather, patent protection is to be limited only by the subjoined patent claims after such claims have been properly interpreted in accordance with the doctrines of patent law.

What is claimed is:

1. An improved roll drum housing for use on board an aircraft, said housing having a hollow cavity in which is received a sensor apparatus, said housing being rotatable about a roll axis that is generally parallel to the flight path of said aircraft, wherein said sensor apparatus rolls about said axis correspondingly with drum housing rotation, said sensor apparatus further being independently pivotable in said housing about a separate azimuthal axis, the improvement comprising:
   a window frame opening in a sidewall of said housing;
   a window frame member slidably positioned across said opening, said frame member having a window aperture which provides said sensor apparatus with a view from inside to outside said housing;
   means for sliding said window frame member back and forth in a direction generally parallel to said roll axis, said sliding means being operatively connected to said sensor apparatus in a manner so that said window sliding occurs correspondingly with azimuthal pivoting of said sensor apparatus, so that said window aperture is continually positioned to permit said sensor apparatus with a view outside said housing as said apparatus changes azimuthal positions in said housing.

2. The improvement of claim 1, wherein said roll drum housing is cylindrical, and wherein said aircraft includes a fuselage roof portion shaped to cradle a lower circumferential portion of said drum housing, for supporting said housing on top of said fuselage, and wherein an upper circumferential portion of said housing is normally exposed to the atmosphere, said window frame opening being normally positioned in said upper circumferential portion when it is desired to operate said sensor apparatus, so that a boundary layer airflow develops on said upper circumferential portion and across said window aperture, and including
   said window aperture in said window frame member having an upstream edge and a downstream edge, said downstream edge extending inwardly into said housing cavity with respect to said upstream edge, and further including
   first blower means, positioned adjacent said upstream edge, for blowing high pressure air across said window aperture and into said boundary layer airflow, and still further including,
   second blower means for blowing high pressure air into said housing cavity, for pressurizing said cavity in a manner so that pressurized air moves outwardly from said cavity through said window aperture,
   wherein said inwardly extending downstream edge and said first and second blower means cooperate with each other to create uniformity in said boundary layer airflow.

3. The improvement of claim 2, wherein said first blower means includes a telescopic conduit having an air blowing port positioned adjacent said upstream edge of said window aperture, said conduit being extendible and retractable correspondingly with back and forth movement of said window frame member, in a manner so that said air blowing port remains adjacent said upstream edge as said window frame member moves.

4. The improvement of claim 3, wherein said second blower means is adjustable to control the amount of high pressure air blown into said cavity.

5. The improvement of claim 1, wherein said sliding means includes a cable cradle portion fixedly connected to said sensor apparatus in a manner so that said cradle portion pivots correspondingly with pivoting movement of said sensor apparatus, said cradle portion having a curved portion, a first line operatively connected to an upstream end of said window frame member, in a manner so that a pulling force can be transmitted through said line to slide said frame member in one direction, a second line operatively connected to a downstream end of said window frame member, in a manner so that a pulling force can be transmitted through said second line to slide said frame member in another direction, cable loop means operatively connecting said first and second lines to said curved portion of said cradle portion, for causing a pulling force to be transmitted through said lines in response to cradle portion pivoting, wherein cradle portion pivoting in one rotational direction causes said window frame member to slide in one direction, and vice versa when said cradle portion pivots in the opposite direction.

6. The improvement of claim 1, wherein
said window aperture in said window frame member has an upstream edge and a downstream edge, said downstream edge extending inwardly into said housing cavity with respect to said upstream edge.

7. The improvement of claim 1, including
first blower means, positioned adjacent an upstream edge of said window frame member, for blowing high pressure air across said window aperture.

8. The improvement of claim 1, including
second blower means for blowing high pressure air into said housing cavity, for pressurizing said cavity in a manner so that pressurized air moves outwardly from said cavity through said window aperture.

9. For a sensor positioned in a cavity within a housing which is mounted onboard an aircraft, said housing having a window aperture for providing said sensor with a line-of-sight view from said cavity outside said housing, said sensor being pivotably mounted in said housing cavity, said window aperture normally being exposed to airflow outside said aircraft during operation of said sensor such that a boundary layer airflow develops across said aperture, an apparatus for controlling said boundary layer airflow, comprising:

means defining an upstream edge of said window aperture;

means defining a downstream edge of said window aperture, wherein said downstream edge extends inwardly into said housing with respect to said upstream edge;

first blower mans, positioned adjacent said upstream edge, for blowing high pressure air across said window aperture and into said boundary layer airflow;

second blower means for blowing high pressure air into said housing cavity, for pressurizing said cavity in a manner so that such air moves outwardly from said cavity through said window aperture; and means for sliding said window aperture back and forth in response to pivoting movement of said sensor in said housing, so that said window aperture is continually positioned to provide said sensor with said line-to-sight view as said sensor pivots.

10. The apparatus of claim 9, wherein said sliding means includes
a cradle portion fixedly connected to said sensor in a manner so that said cradle portion pivots correspondingly with pivoting movement of said sensor, said cradle portion having a curved portion, a first line operatively connected to an upstream end of said window aperture, in a manner so that a pulling force can be transmitted through said like to slide said window aperture in one direction, a second line operatively connected to a downstream end of said window aperture, in a manner so that a pulling force can be transmitted through said second line to slide window aperture in another direction, cable loop means operatively connecting said first and second lines to said curved portion of said cradle portion, for causing a pulling force to be transmitted through said lines in response to cradle portion pivoting, wherein cradle portion pivoting in one rotational direction causes said window aperture to slide in one direction, and vice versa when said cradle portion pivots in the opposite direction.

11. The apparatus of claim 9, including
means defining an upper and a lower transverse edge of said window aperture, said transverse edges connecting said aperture's upstream edge to its downstream edge, said transverse edges also extending inwardly into said housing cavity with respect to said upstream edge.

12. For a sensor positioned in a cavity within a housing mounted onboard an aircraft, said housing having a window aperture for providing said sensor with a line-of-sight view from said cavity outside said housing, said sensor being pivotably mounted in said housing cavity, said window aperture normally being exposed to airflow outside said aircraft during operation of said sensor such that a boundary layer airflow develops across said aperture, an apparatus for controlling said boundary layer airflow, including:

means for sliding said window aperture back and forth in response to pivoting movement of said sensor in said housing, so that said window aperture is continually positioned to provide said sensor with said line-of-sight view as said sensor pivots;

a telescopic conduit having an air blowing port positioned adjacent said upstream edge of said window aperture for blowing high pressure air across said window aperture and into said boundary layer airflow, said conduit being extendible and retractable correspondingly with back and forth movement of said aperture in a manner so that said air blowing port remains adjacent said upstream edge as said aperture moves.

13. The apparatus of claim 12, wherein said aperture further includes a downstream edge which extends inwardly into said housing cavity with respect to said upstream edge.

14. The apparatus of claim 3, including
means defining an upper and lower transverse edge of said window aperture, said transverse edges connecting said aperture's upstream edge to its downstream edge, said transverse edges also extending inwardly into said housing cavity with respect to said upstream edge.

* * * * *

UNITED STATES PATENT AND TRADEMARK OFFICE
CERTIFICATE OF CORRECTION

PATENT NO. : 4,887,779
DATED : December 19, 1989
INVENTOR(S) : David T. Large It is certified that error appears in the above-identified patent and that said Letters Patent is hereby corrected as shown below:

Col. 1, line 37, "older" should be --order--.

Col. 2, line, 46, delete "in".

Col. 5, line 7, "The sensor 22" begins a new paragraph.

Claim 9, col. 8, line 2, "line-to-sight" should be
 -- line-of-sight --.

Claim 10, col. 8, line 11, "like" should be -- line --.

Claim 10, col. 8. line 16, after "slide", insert -- said --.

Signed and Sealed this

Thirteenth Day of August, 1991

*Attest:*

HARRY F. MANBECK, JR.

*Attesting Officer*    *Commissioner of Patents and Trademarks*